United States Patent
Baur et al.

(10) Patent No.: US 12,123,470 B1
(45) Date of Patent: Oct. 22, 2024

(54) FLEXIBLE MULTI-MATERIAL STRUCTURES

(71) Applicant: Government of the United States, as represented by the Secretary of the Air Force, Wright-Patterson AFB, OH (US)

(72) Inventors: Jeffery Baur, Liberty Township, OH (US); David Seifert, Beavercreek, OH (US); Geoffrey Frank, Dayton, OH (US); Patrick Walgren, Anchorage, AK (US); Darren Hartl, College Station, OH (US); Wesley Chapkin, Fairborn, OH (US)

(73) Assignee: United States of America as represented by Secretary of the Air Force, Wright-Patterson AFB, OH (US)

( * ) Notice: Subject to any disclaimer, the term of this patent is extended or adjusted under 35 U.S.C. 154(b) by 96 days.

(21) Appl. No.: 17/373,101

(22) Filed: Jul. 12, 2021

Related U.S. Application Data

(60) Provisional application No. 63/158,541, filed on Mar. 9, 2021, provisional application No. 63/051,928, filed on Jul. 15, 2020.

(51) Int. Cl.
  *F16F 1/36* (2006.01)
(52) U.S. Cl.
  CPC ........ *F16F 1/3605* (2013.01); *F16F 2224/02* (2013.01)
(58) Field of Classification Search
  CPC .................. F16F 1/3605; F16F 2224/02
  See application file for complete search history.

(56) References Cited

U.S. PATENT DOCUMENTS

| | | | | |
|---|---|---|---|---|
| 3,231,256 A | * | 1/1966 | Olson | H05K 3/002 267/141 |
| 4,708,757 A | * | 11/1987 | Guthrie | B32B 37/144 228/173.6 |
| 6,669,184 B2 | * | 12/2003 | Cai | F16F 1/328 267/180 |
| 8,446,073 B2 | * | 5/2013 | Uhlmann | F02M 61/16 267/161 |
| 8,454,290 B2 | * | 6/2013 | Schaser | F16B 5/0258 411/902 |
| 8,540,224 B2 | * | 9/2013 | Guthrie | B60N 2/24 267/164 |

(Continued)

FOREIGN PATENT DOCUMENTS

WO   WO 99/25530   *   5/1999

*Primary Examiner* — Xuan Lan Nguyen
(74) *Attorney, Agent, or Firm* — AFMCLO/JAZ; Larry L. Huston

(57) ABSTRACT

A flexible multi-material structure comprises a spring skeleton comprising a plurality of repeating cells, the cells filled with an infill material, wherein the spring skeleton is one of a machined spring structure and a wave spring structure. The spring skeleton may comprise one of steel and polycarbonate blends, and the infill material may consist of one or more of foamed and monolithic elastomers. The foamed and monolithic elastomers consist of one or more of silicones, polyether, and polyurethane. The Poisson ratio of the infill material is about 0.1 to 0.3. The repeating cells of the spring skeleton have a predetermined wall thickness (t), wall height (h), and revolution symmetry.

1 Claim, 12 Drawing Sheets

(56) References Cited

U.S. PATENT DOCUMENTS

| | | | |
|---|---|---|---|
| 9,416,839 B2* | 8/2016 | Ma | F16F 7/121 |
| 2004/0138700 A1* | 7/2004 | Cooper | A61B 34/71 |
| | | | 606/205 |
| 2013/0096887 A1* | 4/2013 | Fee | F16F 1/3605 |
| | | | 267/153 |
| 2014/0017422 A1* | 1/2014 | Ma | F16F 7/121 |
| | | | 428/34.1 |
| 2021/0177529 A1* | 6/2021 | Liu | A61B 34/30 |

* cited by examiner

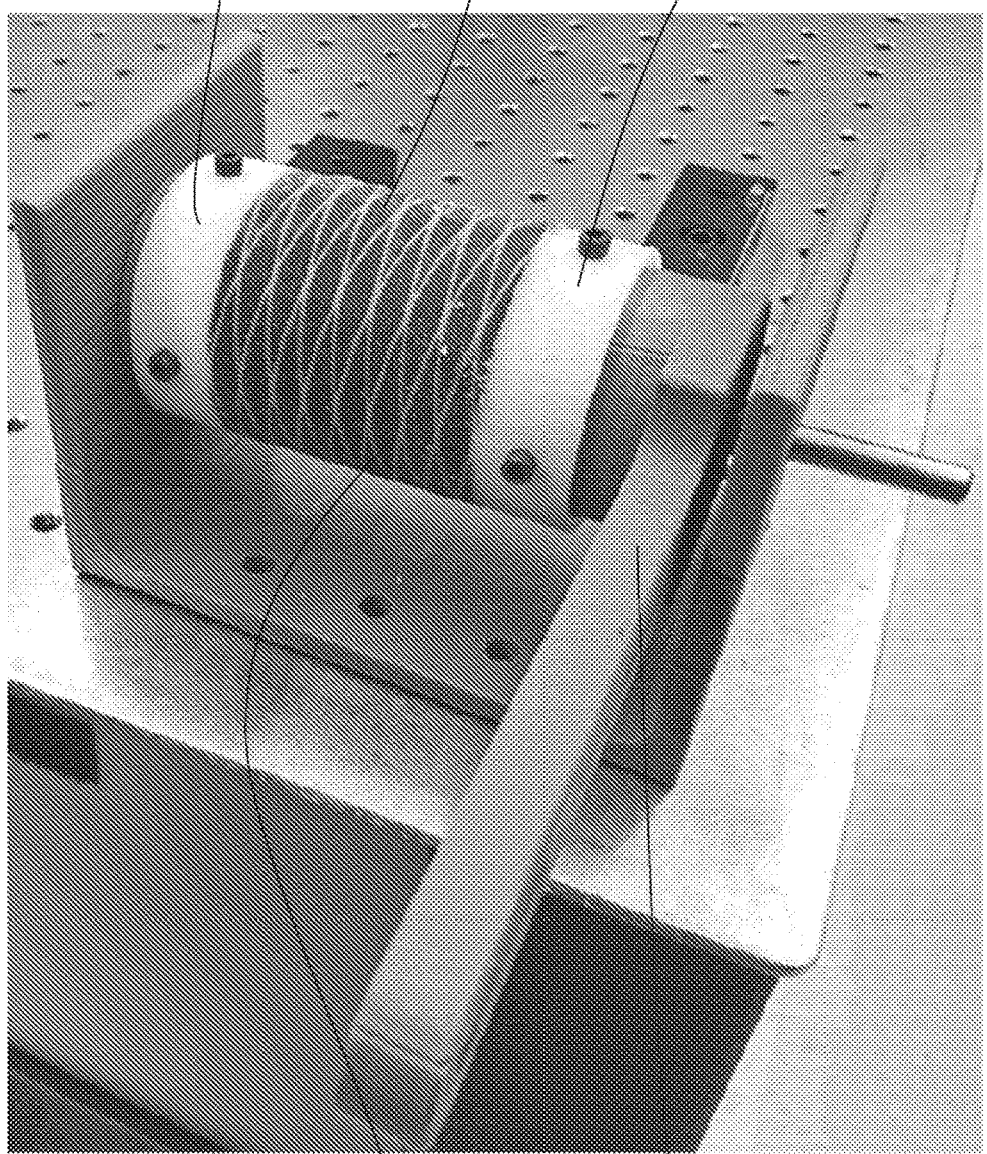
FIG. 6 — Test frame ring, Infill material, Test frame ring, Cylindrical spring skeleton with repeating cells, Torsion test fixture FIG. 8
Machined spring cell
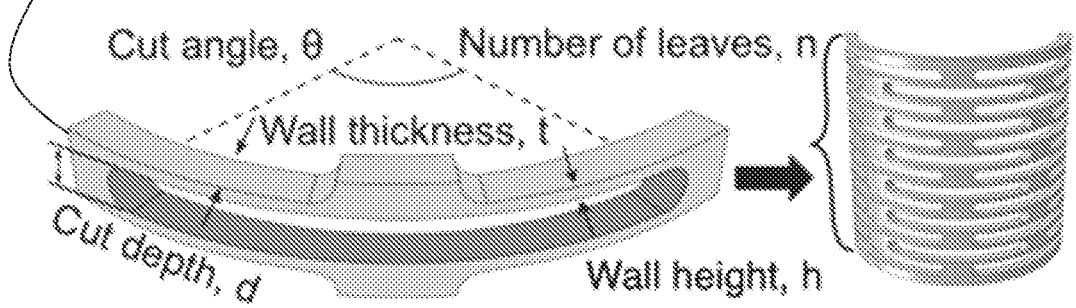
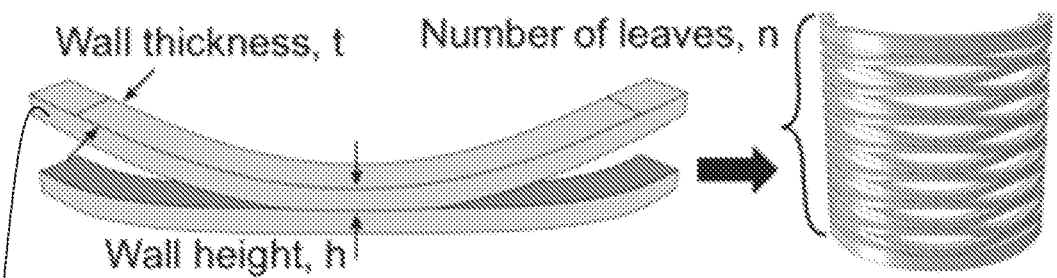
Wave spring cell
| Spring Type | Stiffness | Wall height (mm) | Wall thickness (mm) |
|---|---|---|---|
| Machined | Flex | 3.09 | 5.59 |
| | Medium | 3.09 | 11.2 |
| | Stiff | 3.76 | 11.2 |
| Wave | Flex | 3.39 | 5.59 |
| | Medium | 3.39 | 11.2 |
| | Stiff | 4.34 | 11.2 |

FLEXIBLE MULTI-MATERIAL STRUCTURES

Pursuant to 37 C.F.R. § 1.78(a)(4), this application claims the benefit of and priority to prior filed Provisional Application Ser. No. 63/051,928, filed 15 Jul. 2020, and prior filed Provisional Application Ser. No. 63/158,541, filed 9 Mar. 2021, which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to flexible structures and, more particularly, to flexible multi-material structures that have asymmetric global stiffness properties.

BACKGROUND OF THE INVENTION

Structures that are able to obtain asymmetric global stiffness properties (i.e. a cylinder that is compliant in bending but radially stiff) via architected multi-material substructures have applications in many fields, including medical and aerospace industries. Design of such structures requires careful tailoring of material properties and substructure topology to arrive at optimal performance within tightly constrained design spaces. It is often the case that these structures must survive large global displacements, maintain a smooth outer surface, and provide sufficient mechanical rigidity, e.g. radial rigidity. While myriad solutions exist for flexible, non-load bearing or lightly-loaded joints and for cylindrical structural columns, a monolithic design often falls short of satisfying both objectives. What is desired is a structure composed of multiple materials and/or architected substructures that is able to withstand and transfer loads under changing configurations.

SUMMARY OF THE INVENTION

The present invention overcomes the foregoing problems and other shortcomings, drawbacks, and challenges of flexible, non-load bearing joints and cylindrical structural columns. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a flexible multi-material structure comprises a spring skeleton comprising a plurality of repeating cells, the cells filled with an infill material, wherein the spring skeleton is one of a machined spring structure and a wave spring structure.

According to a first variation, the spring skeleton may comprise one of steel and polycarbonate blends, and wherein the infill material may consist of one or more of foamed and monolithic elastomers. The foamed and monolithic elastomers may consist of one or more of silicones, polyether, and polyurethane.

According to a further variation, the Poisson ratio of the infill material may be about 0.1 to 0.3.

According to another variation, the repeating cells of the spring skeleton have a predetermined wall thickness (t), wall height (h), and revolution symmetry.

The features described above and in the following description may be combined in any conceivable manner in order to achieve desired performance characteristics.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

FIG. 6 presents a cylinder torsion test fixture.

FIG. 8 presents some exemplary parameters for a machined spring and a wave spring.

Figure 1A:
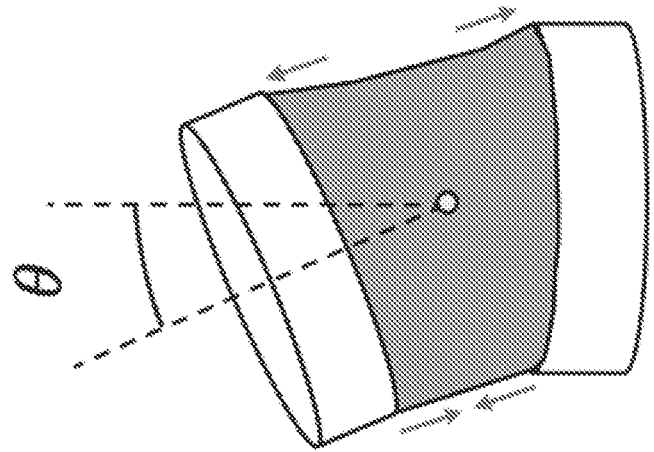
FIG. 1A illustrates a schematic of a morphing cylinder with representational forces acting on the bending region (center section).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration. The terms "about" and "approximate" are understood to indicate +/−10%, +/−10° C., or +/−5 angular degrees of the stated value.

DETAILED DESCRIPTION OF THE INVENTION

Experiments have shown that if the nose of a missile is physically bent or flexed to point more towards its target, then this greatly increases the accuracy of the missile in hitting the target. The invention disclosed herein provides a generally cylindrical-shaped structure with a morphing skin that is capable of handling the torsional and bending stresses that may be encountered by such a flexible missile, or other devices.

Previous efforts in the area of morphing skins have focused on the folding, shear, rotation, or extension of wings. This disclosure specifically investigates the formation of optimal designs for composite cylinders that balance the out-of-plane rigidity needed to resist aerodynamic loads, along with the work needed to articulate the cylinder 25 degrees or more in any direction while maintaining a smooth outer mold line.

The disclosed technique can readily provide thousands of designs, i.e. structural arrangements, which may embody dozens of archetypes. The process may apply bio-inspiration, topology optimization, and finite element analysis methods to arrive at a set of non-dominated designs that span a range of radial rigidity values and bending (articulation) values. To validate the modeled results, various archetypes were fabricated and characterized.

It was found that the archetypes show strong agreement between model predictions and measured responses on the archetypes. As part of the optimization process, graphical material selection methods were used to identify the top performing material classes from a database. The process then used previously printed composites, embedded actuation, and shape memory polymers for further optimization of the most promising structures. Overall, the process provided a multitude of design variations which may be optimized and tested for application and use on different structural and performance problems.

Morphing of cylindrical fuselage sections offers new opportunities and challenges for aerospace structures. Composite morphing skins comprising both high modulus and low modulus materials may be required to enable the desired large articulation. Dozens of archetypes and thousands of structures were examined, including embedded reinforced elastomers, overwrapped skeleton structures, and topology optimized structures. The filled wave spring archetype appears to have a promising balance of torsional and radial stiffness with acceptable bending stiffness. We then optimized the dimensions of the archetype design depending on the properties of the materials selected.

We explored the trade-offs between aerodynamic performance and actuation efficiency with respect to shape-changing aerospace structures. Herein, a morphing cylinder is optimized to minimize both its work to actuate in bending as well as radial deviations. Based on derived linear elastic mechanics of a cylindrical shell in bending, it was determined that favorable designs have high circumferential and low axial stiffnesses. We investigated circumferentially-reinforced composites comprising rigid and elastomeric materials that limit radial displacement yet allow for out-of-plane bending. Designs of flexible elastomeric skins with embedded or underlying reinforcement were modeled, fabricated, and compared to unreinforced skins. Finite element analyses were used to predict the bending kinematics and structural responses. Digital image correlation was used during bending of physical prototypes to generate strain contour plots of cylinder surfaces. Strong agreement between model predictions and experimental measurements was observed. The dimensions of each archetype were systematically varied via finite element modeling to obtain a set of non-dominated designs capable of 25° of bending without buckling or large radial displacements. It was determined that flexible skins reinforced with embedded rings were optimal at low (8-15 Nm) and high (>250 Nm) values for the work to articulate, and flexible skins reinforced with underlying helical springs were optimal at moderate values (15-250 Nm).

The disclosed morphing structures for aerospace and other applications explore the trade-offs between the complexity, cost, weight, and energy needed to activate a shape-changing system with the anticipated benefits in vehicle agility and range. Morphing skins are important components of these systems. Their primary functions are to accommodate the structural shape change while maintaining a desirable outer mold line with sufficient structural integrity to withstand aerodynamic loads. Depending on the application, successful shape-changing skin designs can exhibit directional and/or temporal differences in stiffness.

Stiffness may be engineered to provide the appropriate rigidity in the desired direction in order to minimize unwanted structural deviations under aerodynamically loading. The compliance of the structure in a different direction at a specific time may minimize the total actuation energy needed to effect the shape change. The integration of these aspects into a single structure, with the appropriate design and materials, is a key challenge to the effective function of a morphing skin. A successful design also depends significantly on the type of shape change (bending, expansion, contraction, etc.) required for the intended application.

Figure 1B:
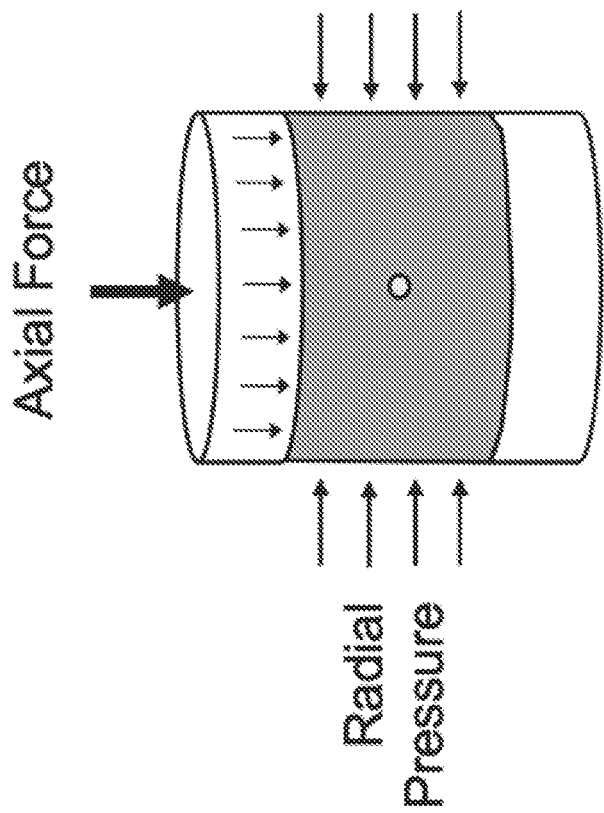
FIG. 1B illustrates that the bending region of FIG. TA undergoes simultaneous tension and compression during articulation, as indicated by the arrows.
Figure 2:
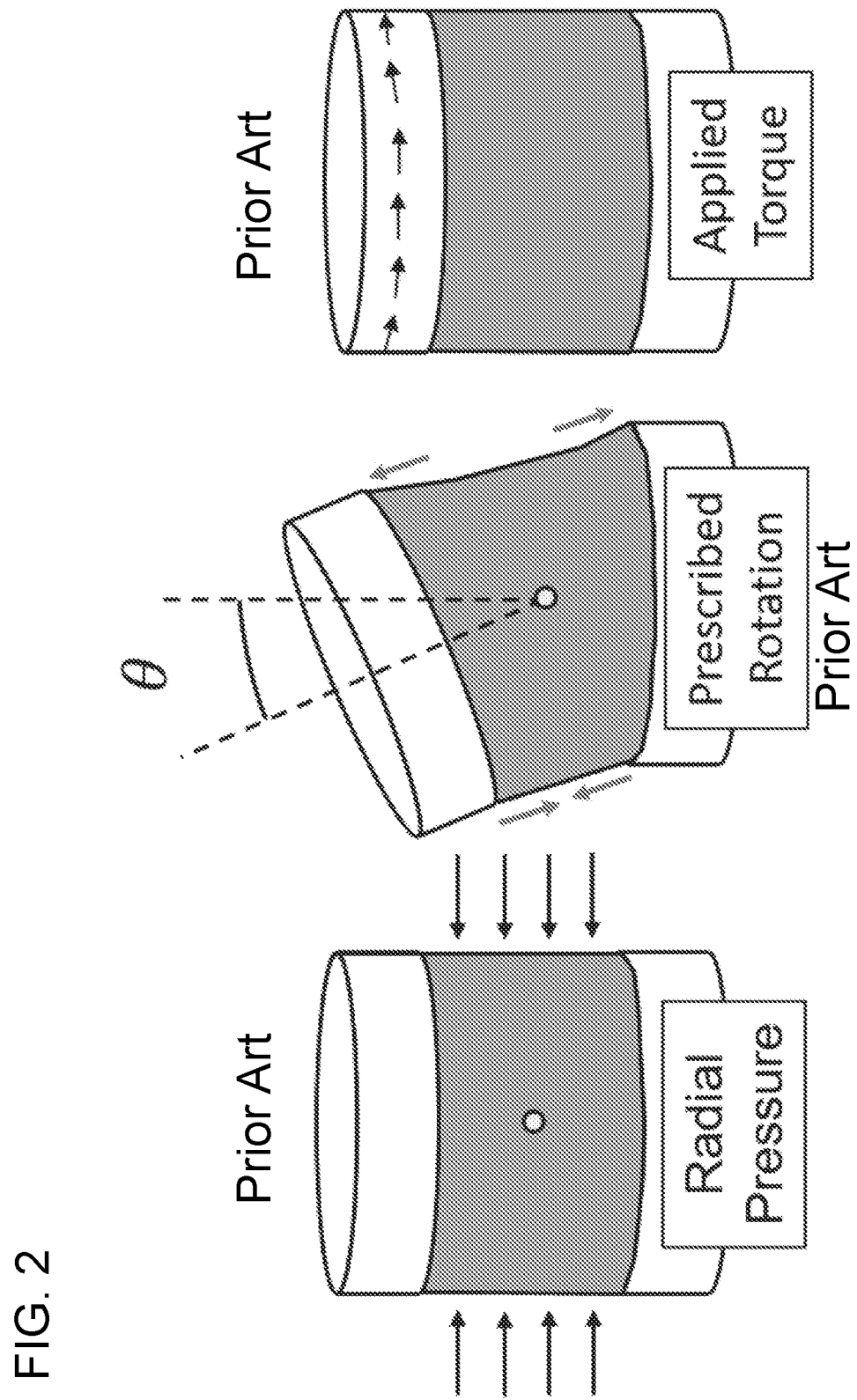
FIG. 2 illustrates applied load cases with optimization design space depicted in gray.
Figure 3A:
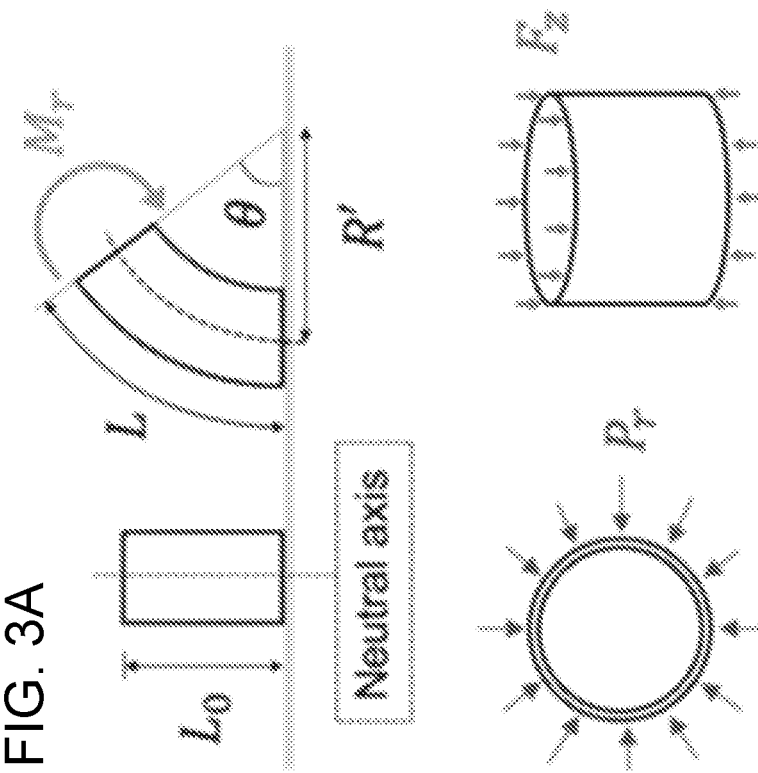
FIG. 3A illustrates large-scale deformation from bending a cylindrical shell with an imposed moment $M_r$, while maintaining shape against an axial load $F_z$ and radial pressure $P_r$.
Figure 3B:
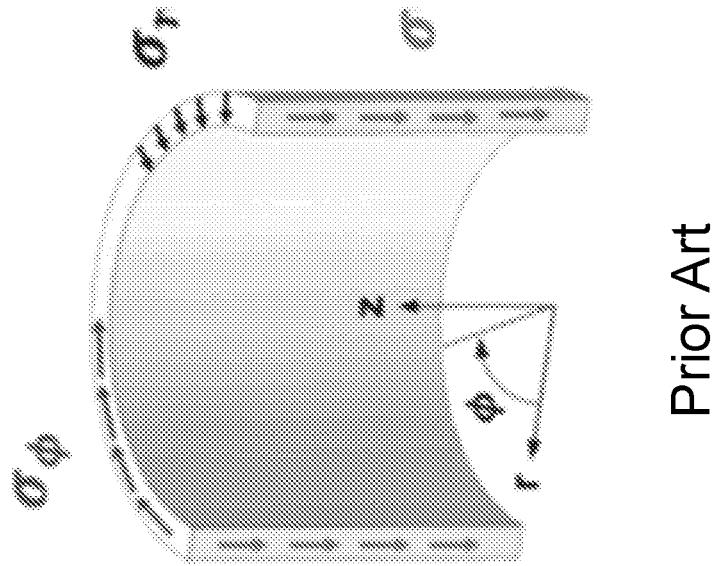
FIG. 3B illustrates that the applied external forces result in radial, hoop, and axial stresses ($\sigma_r$, $\sigma_\phi$, $\sigma_z$) in the shell wall.

Drawing inspiration from nature, morphing wings are the most widely demonstrated example. However, as aerospace structures evolve in complexity, other less-investigated geometries may also warrant examination. One such example includes aerospace structures with ellipsoidal, e.g. cylindrical, cross-sections such as aircraft fuselages, spacecraft struts, or boom shafts. Applying axial bending to this geometry results in an underexplored shape-changing aerospace structure: a morphing cylinder (see FIGS. 1A-1B). FIG. 2 presents three applied load cases, with the optimization space depicted in gray.

A basic requisite for a morphing cylinder is the ability to pivot about a defined point with omni-directionally radial symmetry. Additionally, the structure must maintain a smooth outer mold line (OML) and exhibit sufficiently high circumferential stiffness to prevent significant displacement, i.e. <2.5 mm radial displacement due to aerodynamic loads. The use of low stiffness, high-strain materials and structures in the bending direction ensures that the actuation energy required to articulate the cylinder is minimized.

Although the work to actuate and the shape requirements are usually antithetical, one potential solution to avoid sacrificing the performance of one of the objectives is to utilize variable stiffness materials, i.e. single-materials or composites having rigidity that changes with time. The approach to deform cylinders in bending using variable stiffness materials has been studied previously for medical (viz., endoscopes) and soft robotics (viz., joints) applications. However, since variable stiffness approaches can increase the required energy to actuate the cylinder, the scope of the current study is limited to passive solutions.

The simplest example is a cylindrical shell composed of a high-strain, high-modulus elastomer. However, single-material solutions are generally infeasible for morphing applications. The maximum strains of higher modulus materials are typically exceeded in many morphing designs. Moreover, materials capable of higher elastic strains generally lack the stiffness values necessary to maintain an ideal aerodynamic shape under dynamic loading and/or bending. It therefore follows that—similar to past morphing wing designs—a hybrid solution composed of synergistic elements is an optimal path. These designs combine flexible outer skins that maintain a smooth, continuous outer surface with compliant, load-bearing skeletal structures that reinforce the skins, i.e. a filled skeleton, a stiffer skeleton filled with a less-stiff, high-strain material. With this approach, flexible areas reduce the work to actuate to high strains while underlying, overlapping, or embedded rigid layers carry the majority of the structural loads.

From a design optimization perspective, we seek to minimize the actuation energy involved in articulation while concurrently minimizing the radial shape displacement of the morphing cylinder. Leveraging results from finite element (FE) parametric studies, a variety of reinforced designs are considered, and the performance of each is quantified according to these parameters. Prototypes of the top performing designs were fabricated and physically tested to corroborate FE simulations. Using digital image correlation (DIC), strain maps were generated from bending tests to compare with the models (see FIGS. 5, 9, and 10).

Materials and Methods

Finite Element Analysis (FEA)

Figure 4:
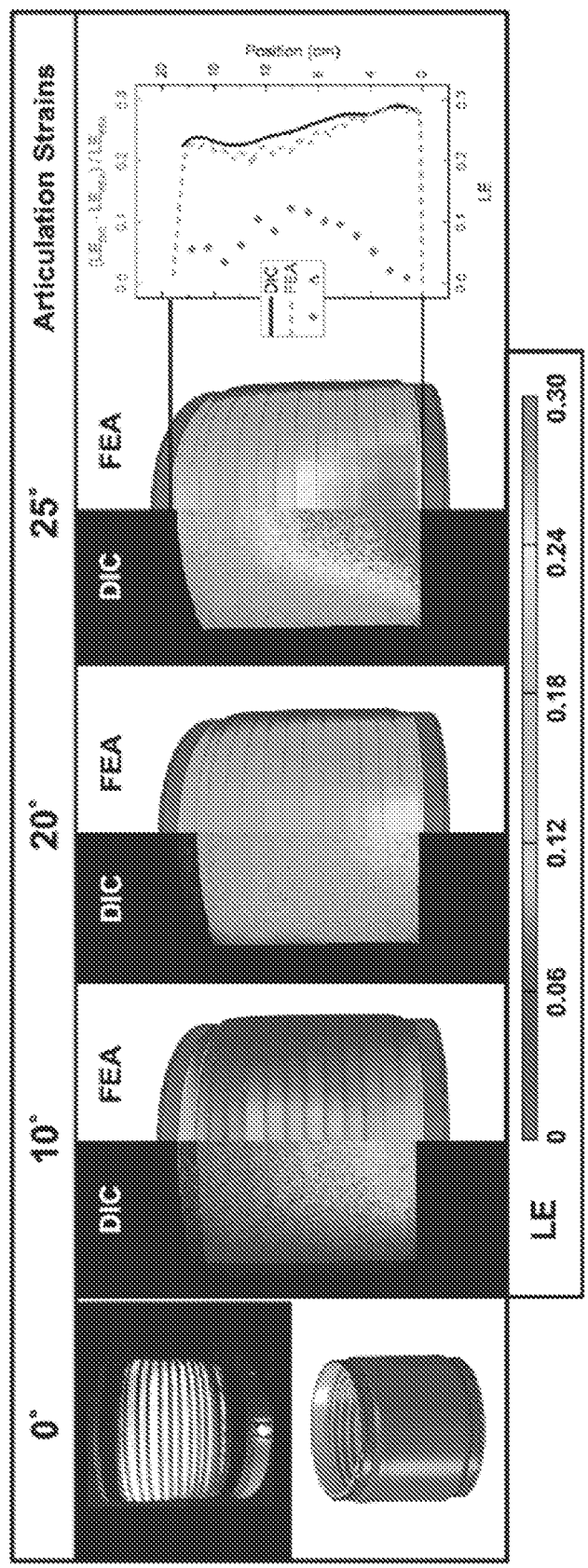
FIG. 4 presents strain maps for the tension side of helical spring-reinforced elastomeric skin articulating to 25° as modeled by Finite Element Analysis (FEA) and experimentally measured by Digital Image Correlation (DIC).

FE models of different morphing cylinder designs were constructed and analyzed in Abaqus (v6.14, Dessault Systemes Simulia Corp.). A helical spring-reinforced elastomer was analyzed using Abaqus/Explicit. Six separate parts were modeled—an elastomeric outer skin, a helical spring, two clamping bands, and two test frame rings at the top and base. The six elements defined the overall morphing skin system. The analysis used an explicit solution to articulate the assembly. Kinetic energy remained sufficiently low compared to strain energy to provide a quasi-static solution. All parts were modeled as linearly elastic with first-order elements. The elastomeric outer skin was modeled with continuum shells, the steel clamping bands were modeled with standard shells, and the steel spring and aluminum test frame rings were modeled with hexahedral elements. A coefficient of friction of 0.5 was assumed between the spring and elastomer. Each test frame ring was coupled to a reference node for which motion was prescribed to control the articulation of the system. Shape deviation was computed by subjecting cylinder unit cells to a radial pressure ($P_r$) differential of 20 psi and calculating the distance for a certain number of nodes relative to the initial cylindrical configuration ($\Delta r$) (see FIG. 4).

Materials

Poly dimethylsiloxane (PDMS) sheets (1 mm in thickness) were purchased from Rubber-Cal Inc. (Santa Ana, CA) and used for the elastomeric skins. Cut sheets were secured to the test fixture with hose clamps. For the reinforced designs, steel helical springs were acquired (Michigan Steel Spring Company, Detroit, MI). All springs had an inside diameter of 17.8 cm. The PDMS sheets were bonded to the springs with Flexseal Black RTV Silicone Sealant from Lawson Inc. (Des Plaines, IL). The springs were then bolted to the fixture for mechanical testing.

Mechanical Test Frame

Figure 5:
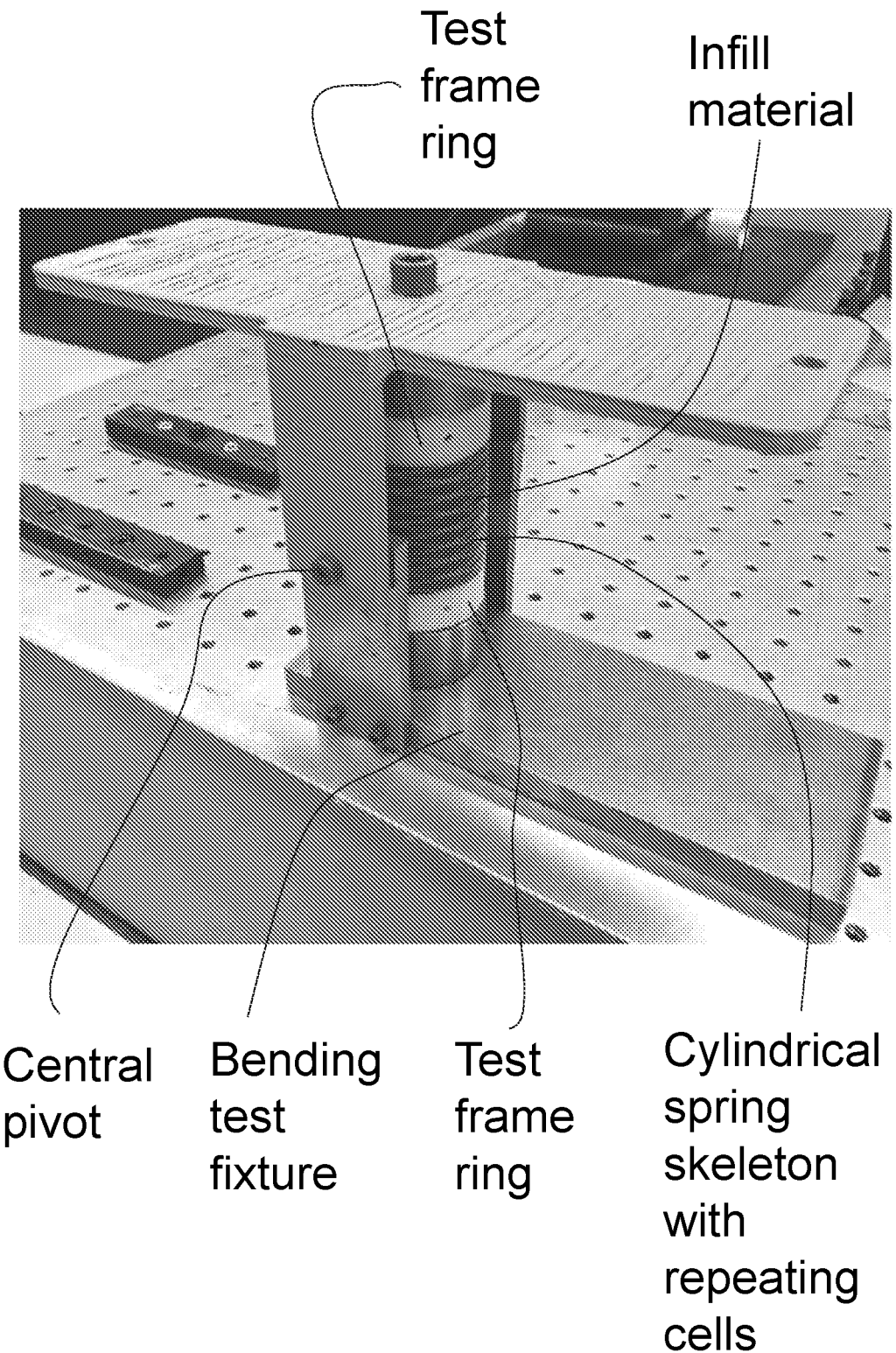
FIG. 5 presents a cylinder bending test fixture.

A custom test fixture was assembled to mechanically test the morphing skin prototype assemblies (FIG. 5). It was designed with the capability of bending a cylinder with a 17.8 cm inside diameter about a central pivot point to a prescribed angle. Articulation kinematics and the resulting strains involved for the studied ranges of motion were collected for various designs. The applied bending moment is calculated by load*lever-arm*gravity. A wave spring embodiment is presented, but the setup and principles are the same for each spring variation. Similarly, a custom torsion testing fixture was assembled to test each embodiment in torsion. FIG. 6 presents a cylinder mounted in the torsion test fixture. The cylinder mounts to the central section and a dead load is applied to the lever arm. The applied bending moment is calculated by load*lever-arm*gravity.

Digital Image Correlation

Figure 7A:
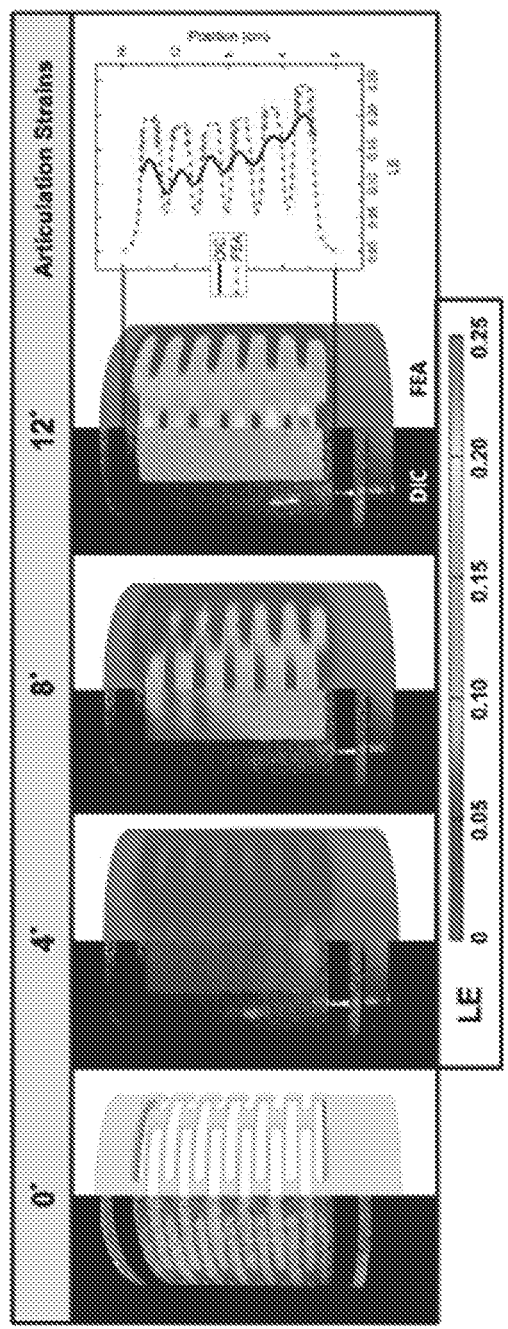
FIGS. 7A-7B present a comparison of articulation strain for a machined spring with an elastomer skin (FIG. 7A) and wave spring with an elastomer skin (FIG. 7B), both model and experimental, according to embodiments of the invention.
Figure 7B:
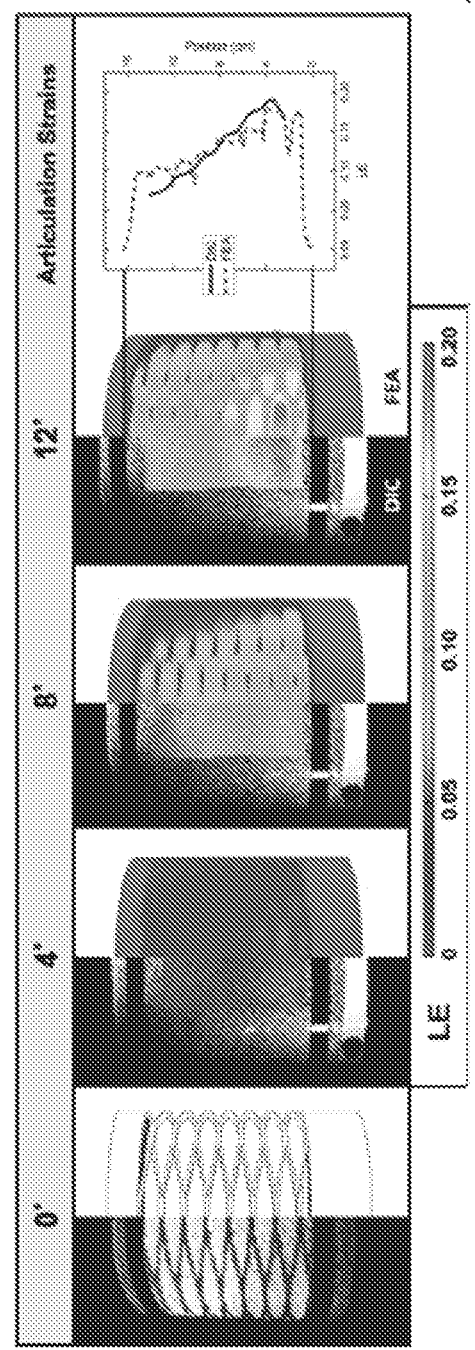

Elastomeric skins were speckled with a black, latex-based paint (see FIG. 6). Speckle size and density were tailored to the desired resolution and field of view. Two cameras (GRAS-20S4M from FLIR Systems, Inc.) with 35 mm lenses (Xenoplan 1.4/17-0903 from Schneider Kreuznach) were placed 0.75 m from the mounted skins. The strain maps (see FIGS. 7A-7B) from digital image correlation (DIC) were generated with VIC-3D software from Correlated Solutions.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Cylinders were fabricated using a Stratasys Objet500 Connex3 printer capable of simultaneously printing in multiple materials. VeroWhite+ was selected as the stiff phase, and FLX9850 was used as the compliant material. Cylinders were manufactured with an outer diameter and a height of 50+-0.2 mm, and a wall thickness of 2.50+-0.2 mm. A pressure wash was used to remove support material from printed cylinders. Bending and torsion text fixtures were assembled primarily from additively manufactured parts. This allowed for highly tailored fixtures with short turn-around times. Parts that could not be printed, such as bushings and fasteners, were purchased. The bending test fixture is shown in FIG. 5 and the torsion test fixture is shown in FIG. 6.

The ablative material comprised a low-temperature polymer elastomer (polyisoprene-butadiene copolymer or polysiloxane) containing nanosilica or Hafnium particles that is infused into a high-strain carbon fiber felt material. Upon exposure to high temperature, the low-temp polymer nanocomposites are converted to high temperature carbonaceous material with a high char yield and the felt help holds it together under strain. It is able to handle more than 3,000° F. for more than 5 minutes.

Materials—We used a ceramic composite of $Al_2O_3$ fibers in an $Al_2O_3$ matrix -Ox-Ox. The SiC/SiC composite is also a robust option.

General Skin Description

The skin may comprise a generally cylindrical shell, i.e. skeleton, connecting a distal end and a proximal end, and a longitudinal axis along its length; having length "L", radius "r", and thickness "t", which bends continuous from theta=0 (collinear with distal and proximal end) to greater than theta=0.22 $L*t/r^2$ without buckling a generally cylindrical shell connecting a distal end and a proximal end, and a longitudinal axis along its length; which bends continuously from theta=0 (collinear with distal and proximal end) to greater than theta=30 degrees without buckling able to withstand 20 psi of radial pressure without more than a 2.5 mm deformation at an point on the skin. Can withstand 285° C. (546° F.) without degradation. Suitable materials include a steel skeleton and a thioether elastomer filled with microballoons to tune the Poisson ratio.

Composite Skins

The inventive arrangement comprises a composite of high strain materials and reinforcing elements having a continuous surface and a work to articulate, i.e. the total energy needed to bend the cylinder, greater than 7 N-m at 25 degrees of bending. The high-strain materials may include elastomers, both foamed and monolithic, including silicones, polyether, and polyurethane. The reinforcing elements, i.e. skeleton, may include rigid plastics (including polycarbonate blends) and steel. The reinforcing elements may be made by additive printing. The reinforcing elements may include continuous circumferential paths of reinforcement to impart torsional rigidity. The reinforcing elements may also include rigid features that interlock upon torsional deformation to impart increasing levels of torsion rigidity. The apparatus may be coated with an ablative material, which allows the skin to survive at least 850° C. for at least 10 minutes. As described above, the ablative material may comprise a low-temperature polymer elastomer (e.g. polyisoprene-butadiene copolymer or polysiloxane) containing nanosilica or Hafnium particles that is infused into a high-strain carbon fiber felt material. Upon exposure to high temperature, the low-temp polymer nanocomposites are converted to high temperature carbonaceous material with a high char yield, and the felt helps hold it together under strain. It is able to handle more than 3,000° F. for more than 5 minutes.

Some non-limiting exemplary parameters for a machined spring and a wave spring are presented in FIG. 8. The presented data demonstrates controllable stiffness values corresponding to variations in wall height and wall thickness. The wall thickness (t) range may be 5-12 mm, the cut depth (d) range may be 7-9 mm, and the wall height (h) range may be 1-5 mm. The stated ranges are approximate and will depend on the selected materials and the desired performance characteristics of the finished device.

Figure 9:
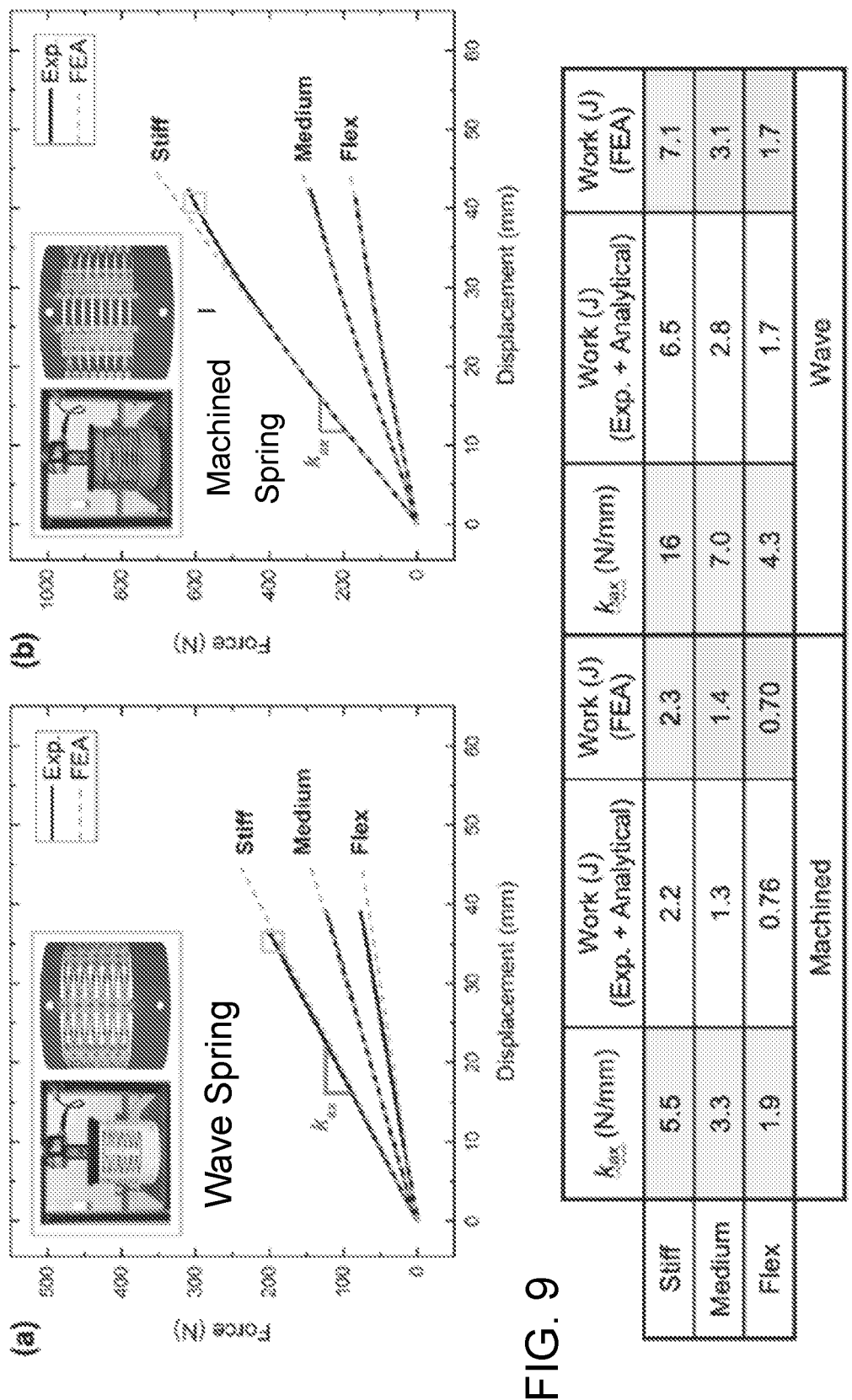
FIG. 9 presents force-displacement relationships for (a) wave springs and (b) machined springs.

FIG. 9 presents force-displacement relationships for (a) wave springs and (b) machined springs. FEA values are included for comparison. At high displacements, local plasticity in the stiff wave spring led to deviations from the linear behavior predicted in FEA.

Figure 10:
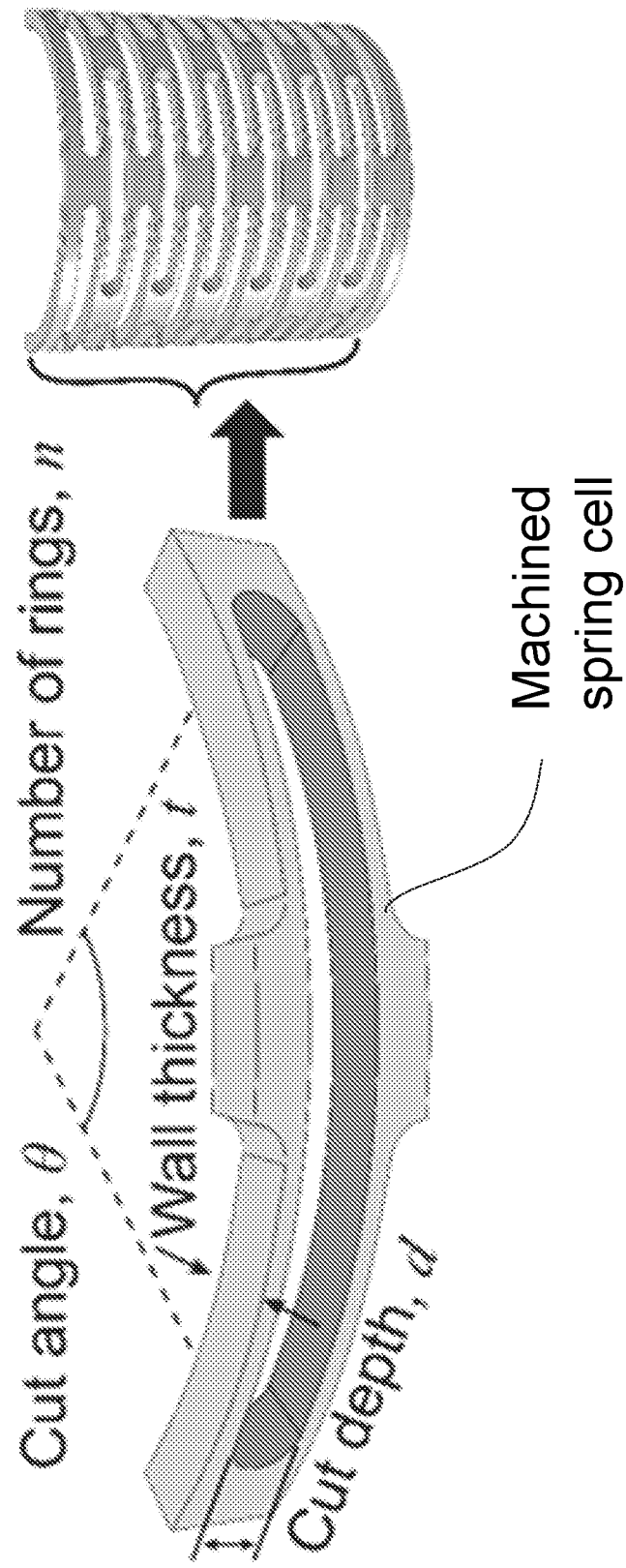
FIG. 10 presents a cell for an exemplary machined spring.

FIG. 10 presents a cell for an exemplary machined spring. A single cell of the machined spring may be a repeating unit having a defined geometry. The cut angle (θ) is measured radially from the center of the generally circular spring. The properties of the machined spring may be tailored to the design requirements through variations in the cut angle (θ), cut depth (d), wall thickness (t), the number of rings (n), and the material from which the machined spring is made. Table 1 presents approximate dimensions and values for the physical parameters of a machined spring. The stated ranges are approximate and will depend on the selected materials and the desired performance characteristics of the finished device.

TABLE 1

| Variable | Min. Value | Max. Value |
|---|---|---|
| Wall Thickness, mm | 5 | 12 |
| Cut Depth, mm | 7 | 9 |
| Number of Rings,- | 5 | 9 |
| Revolution Symmetry, - | 4 | 8 |
| Cut Angle, degrees | 38 | 44 |
| Skin Thickness, in | 3/32 | 1/8 |

Figure 11A:
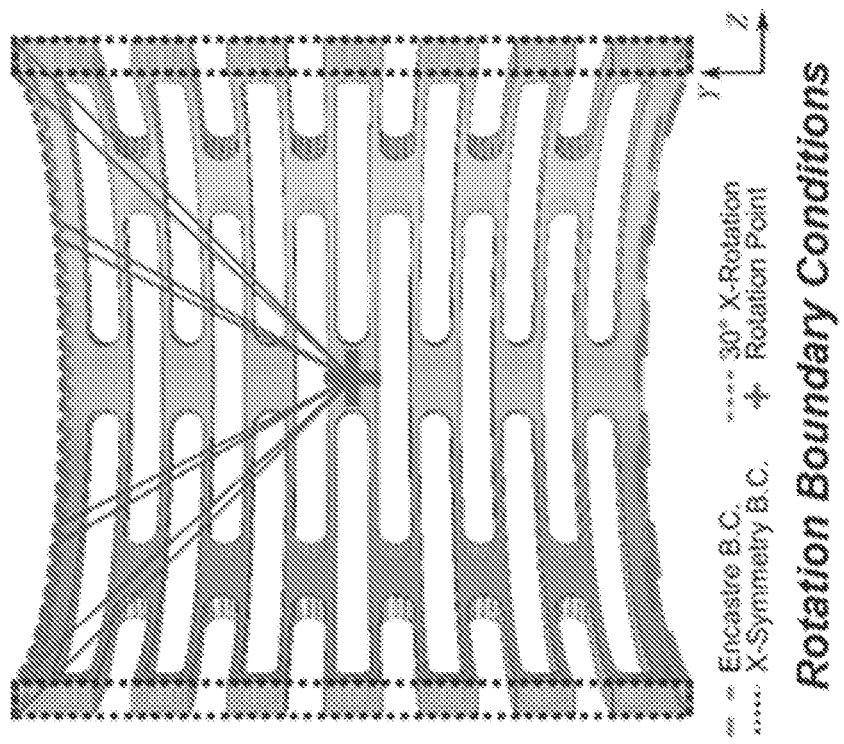
FIGS. 11A-11B present pressure boundary condition (FIG. 11A) and rotation boundary conditions (FIG. 11B) for an exemplary machined spring.
Figure 11B:
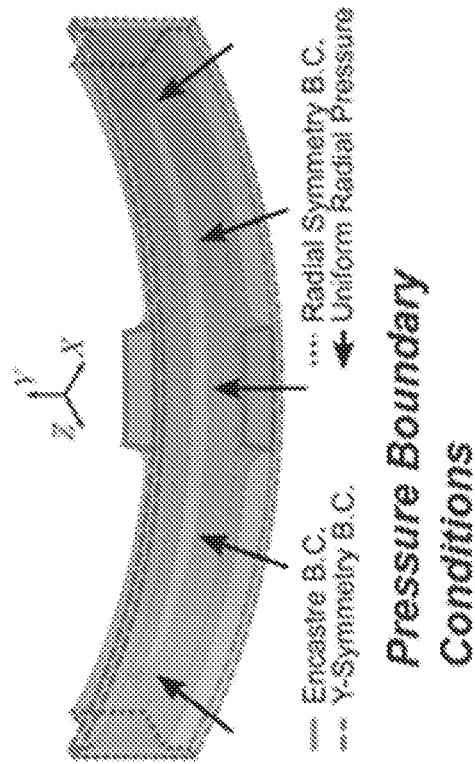

FIGS. 11A-11B present pressure boundary conditions (FIG. 11A) and rotation boundary conditions (FIG. 11B) for an exemplary machined spring. FEM analysis may be used to determine limiting material strain. Dimensions of the spring, e.g. machined spring or wave spring or any other configuration, may be parameterized in order to optimize the spring's performance. The spring may be machined, molded, or additively-manufactured. The spring corresponds to the 'skeleton' of the inventive arrangement. The skeleton performs the role of a flexible support for the 'infill' material, which is described below.

Figure 12:
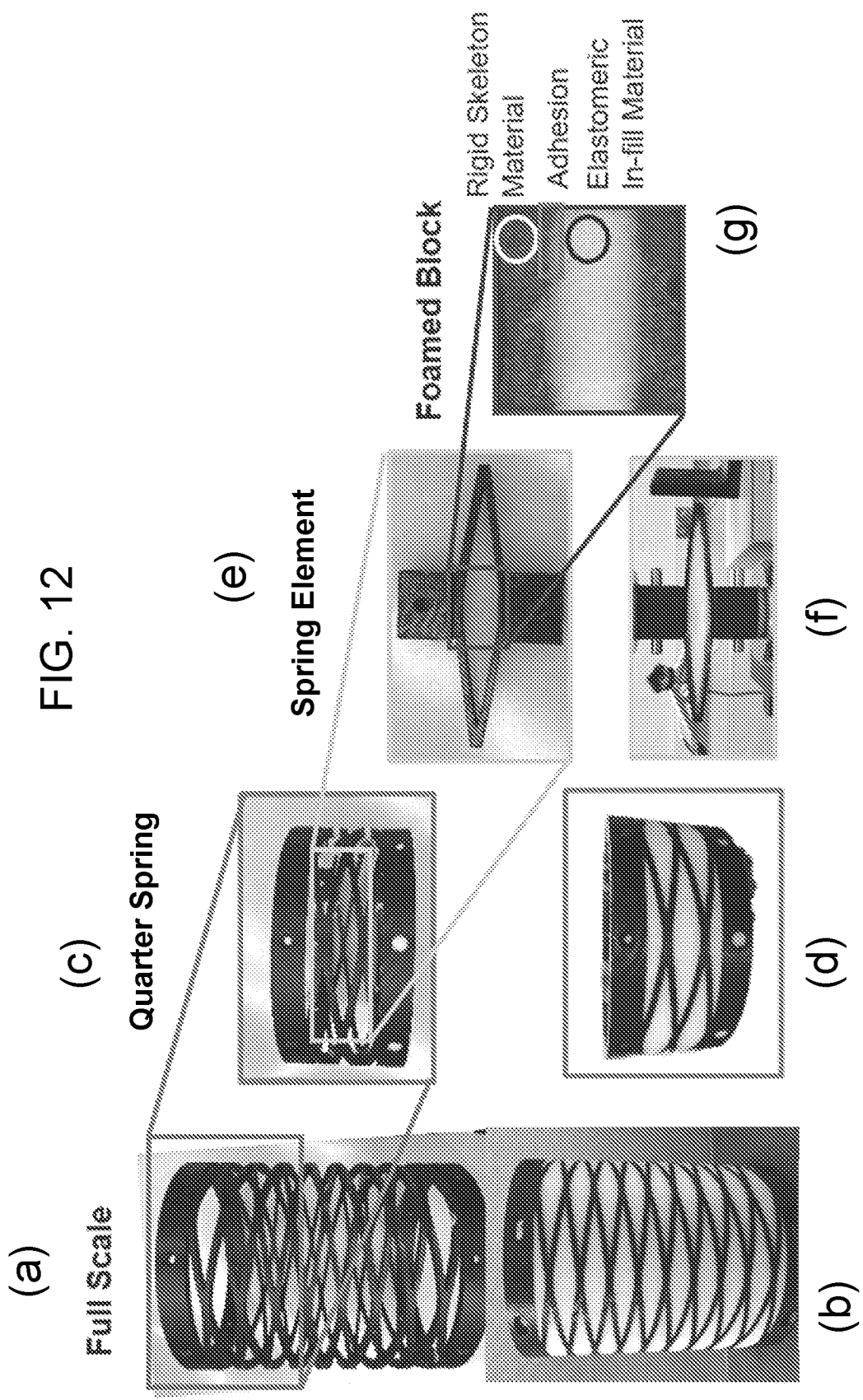
FIG. 12 presents side views of (a) a wave spring, (b) a wave spring with infill material, (c) a quarter spring variation of the wave spring, (d) the quarter spring variation with infill material, (e) a skeleton cell, (f) a cell with infill material, and (g) a close-up view of the interface between the skeleton material and the elastomeric infill material.

FIG. 12 presents side views of (a) a wave spring, (b) a wave spring with infill material, (c) a quarter spring variation of the wave spring, (d) the quarter spring variation with infill material, (e) a skeleton cell, (f) a cell with infill material, and (g) a close-up view of the interface between the skeleton material and the elastomeric infill material.

It was discovered that limiting the Poisson ratio of the infill to a certain range aids in minimizing surface undulations when the skin is articulated. Originally, it was thought that the Poisson ratio of the infill should be 0 (i.e. completely compressible infill material) to minimize surface undulations during articulation. However, this is not supported by the results. Our design process has shown that moderate compressibility, as exhibited by Poisson ratio in the range of about 0.1 to 0.3, is advantageous for reducing surface undulations relative to infill materials that have Poisson ratio above or below that range.

In addition, a further consideration is the tradeoff between cell size, ligament thickness, and infill stiffness in order to achieve a desired articulation angle while avoiding local buckling of material in the cells or global buckling of the entire structure. For a specified spring length, outer diameter, and wall thickness, and selecting specific materials for the structure, there is an optimal cell configuration that maximizes articulation angle subject to a constraint set by limiting pressure-driven wall deformation. Having more than the optimal number of cells in the axial direction results in buckling at lower articulation angles due to excessive in-plane loads when the skin is articulated. Having less than the optimal number of cells in the axial direction results in higher strains at ligament intersections and in higher lateral skin deformation due to lateral pressure loads.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A flexible multi-material structure comprising:
a cylindrical spring skeleton having an axial direction and comprising a plurality of circumferentially elongate repeating cells in a circular arrangement, the plurality of repeating cells circumscribing the skeleton in a number of axially spaced rings ranging from 5 to 9 rings, each cell subtending a cut angle ranging from 38 to 44 degrees and being circumferentially offset from a respective cell in an axially adjacent ring,
each of the plurality of cells filled with an infill material,
wherein the spring skeleton is a machined spring structure, the spring skeleton being hollow and having a constant radius of curvature in an inner surface and an outer surface to form an open tubular arrangement,
wherein the repeating cells of the machined spring structure have a predetermined wall thickness (t) ranging from 5 mm to 12 mm as measured radially from the center of the generally circular spring, wall height (h), cut angle ($\theta$) measured radially from the center of the generally circular spring, and cut depth (d),
wherein the spring skeleton comprises one of steel and polycarbonate blends, and
wherein the infill material consists of one or more of foamed and monolithic elastomers,
wherein the foamed and monolithic elastomers consist of one or more of silicones, polyether, and polyurethane,
wherein the Poisson ratio of the infill material is about 0.1 to 0.3.

* * * * *